(12) United States Patent
Kim

(10) Patent No.: US 8,722,239 B2
(45) Date of Patent: May 13, 2014

(54) TERMINAL OF RECHARGEABLE BATTERY, METHOD OF ASSEMBLING THE TERMINAL OF RECHARGEABLE BATTERY, RECHARGEABLE BATTERY MODULE AND METHOD OF ASSEMBLING THE RECHARGEABLE BATTERY MODULE

(75) Inventor: Dukjung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 437 days.

(21) Appl. No.: 13/034,003

(22) Filed: Feb. 24, 2011

(65) Prior Publication Data
US 2012/0107675 A1 May 3, 2012

(30) Foreign Application Priority Data
Nov. 3, 2010 (KR) .................. 10-2010-0108667

(51) Int. Cl.
*H01M 2/30* (2006.01)
*H01M 10/04* (2006.01)
*H01M 2/02* (2006.01)

(52) U.S. Cl.
USPC .......................... 429/179; 29/623.1

(58) Field of Classification Search
USPC .......................... 429/179; 29/623.1
See application file for complete search history.

(56) References Cited

U.S. PATENT DOCUMENTS

| 4,936,799 | A | * | 6/1990 | Woodall | 439/755 |
| 5,620,291 | A | | 4/1997 | Hayes et al. | |
| 2006/0094289 | A1 | * | 5/2006 | Kim et al. | 439/500 |
| 2010/0233915 | A1 | | 9/2010 | Kim | |
| 2011/0183193 | A1 | * | 7/2011 | Byun et al. | 429/178 |

FOREIGN PATENT DOCUMENTS

| EP | 0 769 820 A1 | 4/1997 |
| EP | 2 230 705 A1 | 9/2010 |
| JP | 2002-203536 A | 7/2002 |
| JP | 2002-237291 A | 8/2002 |
| KR | 1998-075272 A | 11/1998 |
| KR | 10-2010-0105340 A | 9/2010 |

OTHER PUBLICATIONS

Korea Office action dated Mar. 26, 2012, corresponding to 10-2010-0108667, 5 pages.
English Machine Translation of JP 2002-203536 A, 17 pages.
English Machine Translation of JP 2002-237291 A, 7 pages.
Extended European Search Report dated Jun. 7, 2013, issued in corresponding EP Application No. 11165097.4 (7 pages).

* cited by examiner

*Primary Examiner* — Karie O'Neill Apicella
(74) *Attorney, Agent, or Firm* — Christie, Parker & Hale, LLP

(57) ABSTRACT

A terminal of a rechargeable battery, the terminal including a current collecting terminal electrically coupled to an electrode assembly inside a case, wherein the current collecting terminal protrudes from the case; a terminal plate outside of the case and coupled to the current collecting terminal; and a plate spring on the terminal plate and coupled to the current collecting terminal.

7 Claims, 9 Drawing Sheets

TERMINAL OF RECHARGEABLE BATTERY, METHOD OF ASSEMBLING THE TERMINAL OF RECHARGEABLE BATTERY, RECHARGEABLE BATTERY MODULE AND METHOD OF ASSEMBLING THE RECHARGEABLE BATTERY MODULE

CROSS-REFERENCE TO RELATED APPLICATION

This application claims priority to and the benefit of Korean Patent Application No. 10-2010-0108667, filed on Nov. 3, 2010, the entire content of which is incorporated herein by reference.

BACKGROUND

1. Field

The present invention relates to a terminal of a rechargeable battery, a method of assembling the terminal of a rechargeable battery, a rechargeable battery module and a method of assembling the rechargeable battery module.

2. Description of Related Art

In general, rechargeable batteries can be repeatedly discharged and recharged, unlike primary batteries, which are incapable of being recharged. Low capacity rechargeable batteries composed of a single cell are generally used for portable small electronic devices, such as mobile phones, camcorders, or the like. Large capacity rechargeable batteries composed of a plurality of cells connected as a pack are widely used to drive motors of electric scooters, hybrid vehicles, electric vehicles, or the like.

A rechargeable battery may be manufactured in various forms. Representative forms of a rechargeable battery include a cylindrical form or a prismatic form. A typical rechargeable battery includes an electrode assembly having a positive electrode and a negative electrode with a separator located therebetween, a case that provides a space to house the electrode assembly and an electrolyte, and a cap plate installed on the case. A positive electrode terminal and a negative electrode terminal are connected to the electrode assembly and are exposed or protrude outwardly through the cap plate.

SUMMARY

Embodiments of the present invention provide a terminal of a rechargeable battery, a method of assembling the terminal of a rechargeable battery, a rechargeable battery module and a method of assembling the rechargeable battery module, which can form a permanent contact area, that is, a current path, using elasticity of a plate spring while improving endurance and mechanical and electrical reliability of the terminal by integrally forming a current collecting terminal and a terminal plate, and coupling the current collecting terminal and a plate spring to each other on the terminal plate.

Embodiments of the present invention also provide a terminal of a rechargeable battery, a method of assembling the terminal of a rechargeable battery, a rechargeable battery module and a method of assembling the rechargeable battery module, which can flexibly absorb external forces applied to the terminal, thereby maintaining and improving a coupling force of the terminal, by coupling a bus bar on a plate spring using nut connection or riveting.

Embodiments of the present invention still further provide a terminal of a rechargeable battery, a method of assembling the terminal of a rechargeable battery, a rechargeable battery module and a method of assembling the rechargeable battery module, which can extend a current path to reduce electric resistance of the terminal and maintain a permanent contact, by allowing the current passing through a current collecting terminal to be transferred to a bus bar through a plate spring having a relatively large sectional area.

In one embodiment, a terminal of a rechargeable battery is provided, the terminal including a current collecting terminal electrically coupled to an electrode assembly inside a case, wherein the current collecting terminal protrudes from the case; a terminal plate outside of the case and coupled to the current collecting terminal; and a plate spring on the terminal plate and coupled to the current collecting terminal.

In one embodiment, the current collecting terminal and the terminal plate are integral with each other as a single piece. Further, the current collecting terminal may include a current collecting body electrically coupled to the electrode assembly and coupled to the terminal plate; and a bolt portion extending from the current collecting body. Additionally, the terminal plate may include a terminal body having a throughhole configured to allow the current collecting terminal to pass therethrough; and a sidewall portion extending from a periphery of the terminal body.

In one embodiment, the plate spring has a hollow internal space and a throughhole on a top surface and a bottom surface, wherein the current collecting terminal passes through the throughhole on the top and bottom surfaces. In one embodiment, an interior portion of the top surface of the plate spring protrudes past a top surface of the terminal plate. Further, peripheral edges of the top surface of the plate spring may be recessed from a central portion thereof.

In another embodiment, a method of assembling a terminal of a rechargeable battery including a case is provided, the method including coupling a terminal plate to a current collecting terminal protruding from the case; and coupling a plate spring to the current collecting terminal on the terminal plate.

In another embodiment, a rechargeable battery module is provided including a plurality of rechargeable battery terminals, each of the battery terminals including a current collecting terminal electrically connected to an electrode assembly inside a case and protruding outwardly from the case; a terminal plate positioned outside the case and coupled to the current collecting terminal; and a plate spring positioned on the terminal plate and coupled to the current collecting terminal; and a bus bar coupled to the plate spring of the current collecting terminal of a first rechargeable battery to the current collecting terminal of a second rechargeable battery adjacent to the first rechargeable battery.

In another embodiment, a method of assembling a battery module having a plurality of rechargeable battery terminals, each of the battery terminals including a current collecting terminal electrically connected to an electrode assembly inside a case, wherein the current collecting terminal protrudes from the case a terminal plate outside the case and coupled to the current collecting terminal; and a plate spring on the terminal plate and coupled to the current collecting terminal, the method including coupling the current collecting terminal of a first rechargeable battery to the current collecting terminal of a second rechargeable battery adjacent to the first rechargeable battery by placing a bus bar on the plate spring of each of the current collecting terminals.

As described above, in the terminal of a rechargeable battery, the method of assembling the terminal of a rechargeable battery, the rechargeable battery module and the method of assembling the rechargeable battery module according to an embodiment of the present invention, a current collecting terminal and a terminal plate are integrally formed with each other, and the current collecting terminal and a plate spring are coupled to each other on the terminal plate, thereby forming a permanent contact area, that is, a current path, using elasticity of the plate spring while improving endurance and mechanical, electrical reliability of the terminal.

In addition, in the terminal of a rechargeable battery, the method of assembling the terminal of a rechargeable battery, the rechargeable battery module and the method of assembling the rechargeable battery module according to an embodiment of the present invention, a bus bar is coupled on a plate spring using nut connection or riveting, thereby flexibly absorbing external forces applied to the terminal while maintaining and improving a coupling force of the terminal.

Further, in the terminal of a rechargeable battery, the method of assembling the terminal of a rechargeable battery, the rechargeable battery module and the method of assembling the rechargeable battery module according to an embodiment of the present invention, the current passing through a current collecting terminal is transferred to a bus bar through a plate spring having a relatively large sectional area, thereby extending a current path to thus reduce electric resistance of the terminal and maintain a permanent contact.

Additional aspects and/or advantages of the invention will be set forth in part in the description which follows and, in part, will be obvious from the description, or may be learned by practice of the invention.

BRIEF DESCRIPTION OF THE DRAWINGS

The objects and features of the present invention will be more apparent from the following detailed description in conjunction with the accompanying drawings, in which.

DETAILED DESCRIPTION OF THE EMBODIMENTS

Hereinafter, examples of embodiments of the invention will be described in detail with reference to the accompanying drawings such that they can easily be made and used by those skilled in the art.

Figure 1:
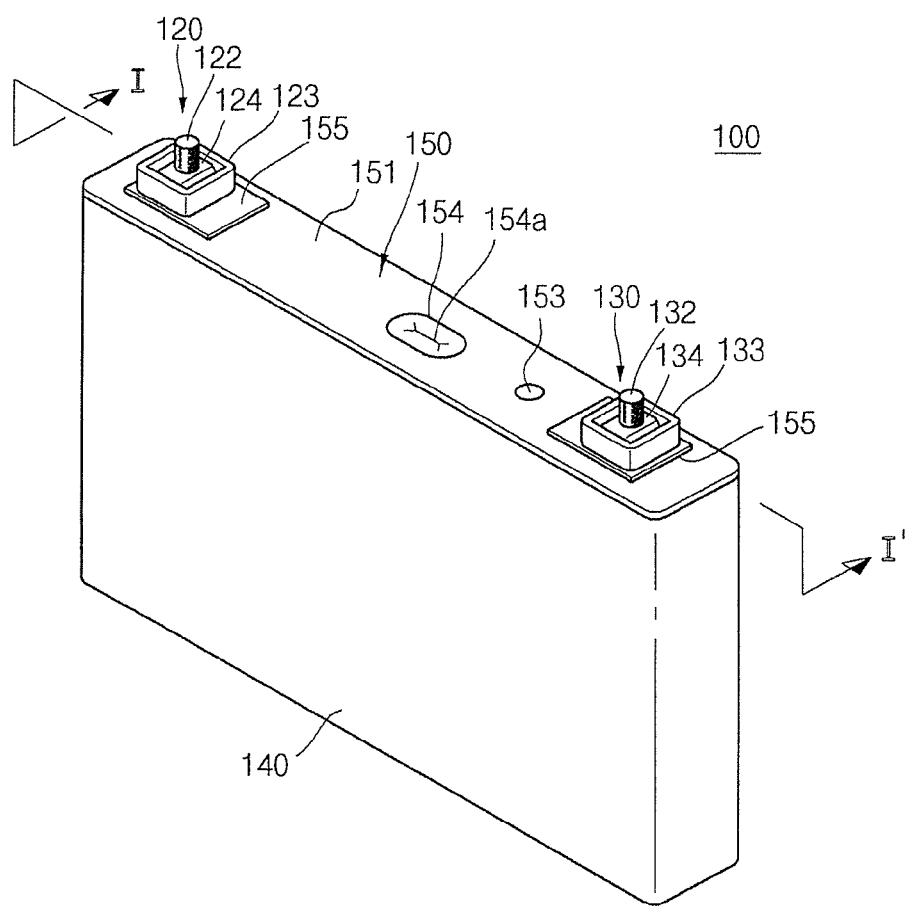
FIG. 1 is a perspective view of a rechargeable battery according to an embodiment of the present invention.
Figure 2:
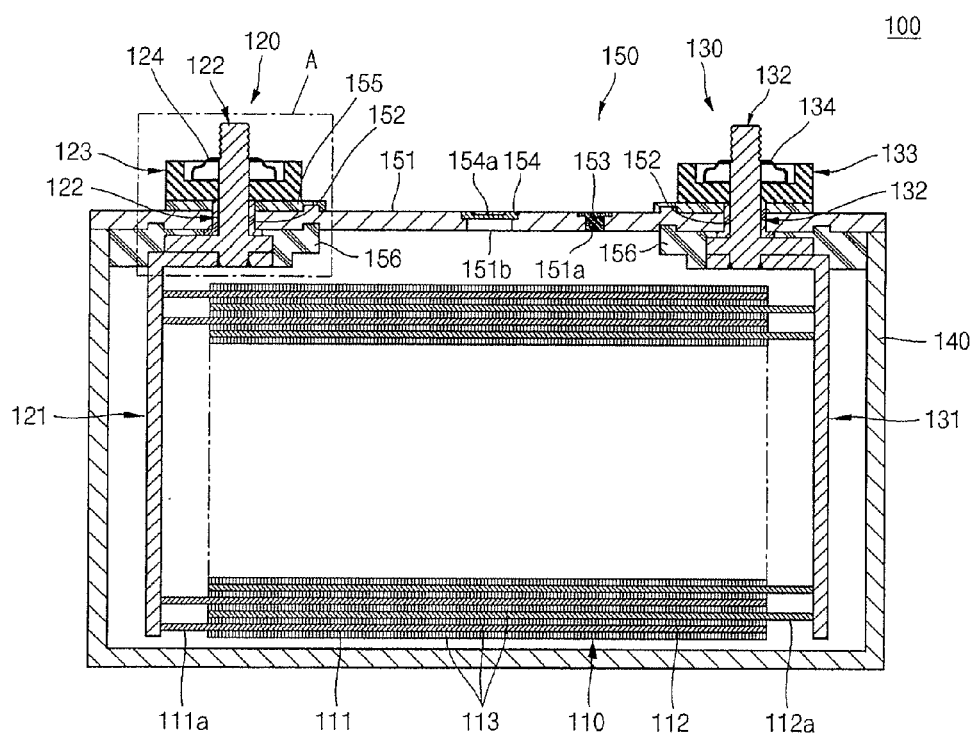
FIG. 2 is a cross-sectional view of the rechargeable battery, taken along the line I-I' of FIG. 1.
Figure 3:
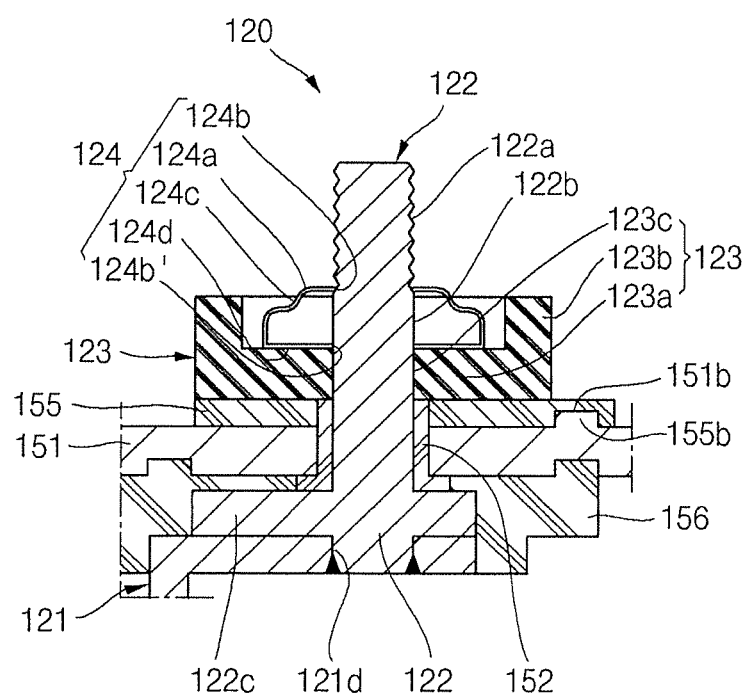
FIG. 3 is an enlarged cross-sectional view of a portion 'A' shown in FIG. 2.

FIG. 1 is a perspective view of a rechargeable battery according to an embodiment of the present invention, FIG. 2 is a cross-sectional view of the rechargeable battery, taken along the line I-I' of FIG. 1, and FIG. 3 is an enlarged cross-sectional view of a portion 'A' shown in FIG. 2.

As shown in FIGS. 1 through 3, the rechargeable battery 100 according to the illustrated embodiment of the present invention includes an electrode assembly 110, a first terminal 120, a second terminal 130, a case 140, and a cap assembly 150.

The electrode assembly 110 is formed by winding or laminating a stacked structure having a first electrode plate 111, separator 113, second electrode plate 112 formed of a thin plate or layer. Here, the first electrode plate 111 may serve as a negative electrode and the second electrode plate 112 may serve as a positive electrode, and vice versa.

The first electrode plate 111 is formed by coating a first electrode active material made of graphite or carbon on a first electrode current collector formed of a metal foil made of, for example, copper or nickel, and has a first electrode uncoated region 111a that is not coated with a first electrode active material. The first electrode uncoated region 111a corresponds to a path of current flow between the first electrode plate 111 and the outside of the first electrode plate 111. However, the present invention is not limited to the materials of the first electrode plate 111 listed herein.

The second electrode plate 112 is formed by coating a second electrode active material made of a transition metal oxide on a second electrode current collector formed of a metal foil made of, for example, aluminum, and has a second electrode uncoated region 112a that is not coated with a second electrode active material. The second electrode uncoated region 112a corresponds to a path of current flow between the second electrode plate 112 and the outside of the second electrode plate 112. However, the present invention is not limited to the materials of the second electrode plate 112 listed herein.

Polarities of the first electrode plate 111 and the second electrode plate 112 may be reversed.

The separator 113 is located between the first electrode plate 111 and the second electrode plate 112 to prevent an electrical short while allowing lithium ions to move. In addition, the separator 113 may be made of polyethylene, polypropylene, or a composite film of polyethylene and polypropylene. However, the present invention is not limited to the materials of the separator 113 listed herein.

A first terminal 120 and a second terminal 130 electrically connected to the first electrode plate 111 and the second electrode plate 112, respectively, are coupled to either end of the electrode assembly 110.

The electrode assembly 110 is housed in the case 140 together with an electrolyte solution. The electrolytic solution may include lithium salt such as LiPF or LiBF dissolved in an organic solvent such as EC (ethylene carbonate), PC (propylene carbonate), DEC (diethyl carbonate), EMC (ethyl methyl carbonate), or DMC (dimethyl carbonate). In addition, the electrolytic solution may be in a liquid, solid or gel state.

The first terminal 120 is generally made of a metal or equivalents thereof and is electrically connected to the first electrode plate 111. The first terminal 120 includes a first current collecting plate 121, a first current collecting terminal 122, a first terminal plate 123 and a first plate spring 124.

The first current collecting plate 121 comes into contact with the first electrode uncoated region 111a protruding to one end of the electrode assembly 110. In practice, the first current collecting plate 121 is welded to the first electrode uncoated region 111a. The first current collecting plate 121 is formed in a substantially 'r' or "L" shape, and has a throughhole 121d formed thereon. The first current collecting terminal 122 is fitted into the throughhole 121d to be engaged therewith. The first current collecting plate 121 is formed of, for example, copper or a copper alloy, but is not limited thereto.

The first current collecting terminal 122 passes through and protrudes from a cap plate 151. In addition, the first current collecting terminal 122 is electrically connected to the first current collecting plate 121 at a lower portion of the cap plate 151. The first current collecting terminal 122 includes a laterally extended flange 122c formed under the cap plate 151 to prevent the first current collecting terminal 122 from being dislodged from the cap plate 151 while upwardly protruding from the cap plate 151. A portion of the first current collecting terminal 122, which is formed under the flange 122c, is fitted into the throughhole 121d of the first current collecting plate 121 and welded thereto. In addition, a portion of the first current collecting terminal 122, which is formed on the flange 122c, is integrally formed with the first terminal plate 123. Here, the first terminal plate 123 is fitted into the portion of the first current collecting terminal 122 which is formed on the flange 122c, and welded thereto. The first current collecting terminal 122 formed on the flange 122c includes a current collecting body 122b and a bolt portion 122a. The current collecting body 122b is electrically connected to the electrode assembly 110 and coupled to the terminal plate 123. In addition, the bolt portion 122a extends from the current collecting body 122b away from the electrode assembly and has a plurality of threads. The bolt portion 122a is fixedly coupled to a bus bar to be described later by nut connection or riveting when it is assembled with the bus bar.

The first current collecting terminal 122 is electrically insulated from the cap plate 151 and may be made of at least one selected from, for example, copper, a copper alloy and equivalents thereof, but is not limited thereto.

The first terminal plate 123 includes a terminal body 123a and a sidewall portion 123b. A cross section of the first terminal plate 123 is formed in a substantially 'U' shape, and has a throughhole 123c formed at its center in a substantially vertical direction to allow the first current collecting terminal 122 to pass therethrough. The first terminal plate 123 may be integrally formed with the first current collecting terminal 122. In addition, the first terminal plate 123 may be made of at least one selected from, for example, stainless steel, copper, copper alloy, aluminum, aluminum alloy, but is not limited thereto. Further, the first terminal plate 123 and the cap plate 151 are insulated from each other.

The first plate spring 124 is positioned on the first terminal plate 123 and is coupled to the first current collecting terminal 122. In other words, the first plate spring 124 has a hollow internal space, and throughholes 124b and 124b' are formed on top and bottom surfaces 124a and 124d, respectively, to allow the current collecting terminal 122 to pass through the top and bottom surfaces 124a and 124d for coupling. Here, the top and bottom surfaces 124a and 124d of the first plate spring 124 are connected to each other to be integrally formed. However, the present invention does not limit the first plate spring 124 to having a connected to the bottom surface 124d. As shown in FIG. 4D, the first plate spring 124 may have a separated bottom surface 124b. A central portion of the top surface 124a of the first plate spring 124 is higher (i.e., farther away from the electrode assembly) than the top surface of the first terminal plate 123. In addition, peripheral edges 124c of or adjacent to the top surface 124a of the first plate spring 124 are lower than the central portion thereof. When the bus bar to be described later is coupled to the top surface 124a of the first plate spring 124, a permanent contact between the bus bar and the top surface 124a of the first plate spring 124 is established due to repulsion or bias caused by elasticity of the top surface 124a, and a coupling force can be maintained. The first plate spring 124 may be made of a highly elastic copper alloy such as phosphor bronze, beryllium copper, and yellow brass, but is not limited thereto.

The second terminal 130 is generally also made of a metal or equivalents thereof and is electrically connected to the second electrode plate 112. The second terminal 130 includes a second current collecting plate 131, a second current collecting terminal 132, a second terminal plate 133 and a second plate spring 134. In one embodiment, a shape of the second terminal 130 may be the same as the first terminal 120, and a description thereof will not be given. However, the second current collecting plate 131 and the second current collecting terminal 132 may be generally made of at least one selected from aluminum, an aluminum alloy and equivalents thereof, but are not limited thereto. In addition, the second terminal plate 133 may be generally made of at least one selected from stainless steel, aluminum, an aluminum alloy, copper, a copper alloy and equivalents thereof, but not limited thereto.

Further, the second terminal plate 133 may be electrically connected to the cap plate 151. Therefore, the case 140 and the cap plate 151, which will be described below, may have the same polarity as the second terminal 130, for example, a positive polarity.

The second current collecting terminal 132 is electrically connected to the electrode assembly 110, and includes a current collecting body 122b connected to the second terminal plate 133, and a bolt portion 122a extending away from the current collecting body 122b. The second current collecting terminal 132 may be integrally formed with the second terminal plate 133. In addition, the second terminal plate 133 includes a terminal body having a throughhole allowing the second current collecting terminal 132 to pass therethrough, and a sidewall portion extending from an edge of the terminal body.

As described above, according to the illustrated embodiment, the current collecting terminals 122 and 132 and the terminal plates 123 and 133 are integrally formed with each other, and the terminal plates 123 and 133 are coupled to the plate springs 124 and 134, respectively, thereby forming a permanent contact region, i.e., a current path, using elasticity of the plate springs 124 and 134, while improving mechanical and electrical reliability.

In one embodiment, the case 140 is made of a conductive metal such as aluminum, an aluminum alloy, or nickel plated steel, and is formed in a substantially hexahedral shape having an opening to allow the electrode assembly 110, the first terminal 120 and the second terminal 130 to be inserted and seated therein. Although the opening is not illustrated in FIG. 2 showing a state in which the case 140 and the cap assembly 150 are coupled to each other, it generally corresponds to a portion in which the peripheral portion of the cap assembly 150 is opened. Since the inner surface of the case 140 is insulated, the case 140 can be insulated from the electrode assembly 110, the first terminal 120, the second terminal 130 and the cap assembly 150.

The cap assembly 150 is coupled to the case 140. Specifically, the cap assembly 150 includes a cap plate 151, a seal gasket 152, a plug 153, a safety vent 154, an upper insulation member 155 and a lower insulation member 156. It will be appreciated that the seal gasket 152, the upper insulation member 155 and the lower insulation member 156 may also be components of the first terminal 120 or the second terminal 130.

The cap plate 151 seals the opening of the case 140, and may be made of the same material as the case 140. For example, the cap plate 151 may be coupled to the case 140 by laser welding. As described above, since the cap plate 151 may have the same polarity as the second terminal 130, the cap plate 151 and the case 140 may also have the same polarity.

The seal gasket 152 is formed between each of the first current collecting terminal 122 and the second current collecting terminal 132, and the cap plate 151 using an insulating material, thereby sealing regions between each of the first current collecting terminal 122 and the second current collecting terminal 132 and the cap plate 151. The seal gasket 152 significantly prevents external moisture from infiltrating into the rechargeable battery 100 and significantly prevents an electrolytic solution contained in the rechargeable battery 100 from leaking.

The plug 153 seals an electrolytic solution injection hole 151a of the cap plate 151, and the safety vent 154 is installed in a vent hole 151b of the cap plate 151. A notch 154a may further be formed so that the vent can be opened at a predetermined pressure.

The upper insulation member 155 is formed between each of the first terminal plate 123 and the second terminal plate 133 and the cap plate 151. In addition, the upper insulation member 155 is closely adhered to the cap plate 151. Further, the upper insulation member 155 may also be closely adhered to the seal gasket 152. The upper insulation member 155 insulates each of the first terminal plate 123 and the second terminal plate 133 from the cap plate 151.

The lower insulation member 156 is formed between each of the first current collecting plate 121 and the second current collecting plate 131 and the cap plate 151 to prevent unnecessary electric shorts from occurring. In other words, the lower insulation member 156 prevents electric shorts between the first current collecting plate 121 and the cap plate 151 and between the second current collecting plate 131 and the cap plate 151. In addition, the lower insulation member 156 is also formed between each of the first current collecting terminal 122 and the second current collecting terminal 132 and the cap plate 151, thereby preventing unnecessary electric shorts from occurring between each of the first current collecting terminal 122 and the second current collecting terminal 132 and the cap plate 151.

FIGS. 4A through 4D sequentially illustrate a method of assembling the terminal of a rechargeable battery according to an embodiment of the present invention. In the following description, the invention will be described with regard to a first terminal because the first and second terminals have substantially the same configuration.

Figure 4A:
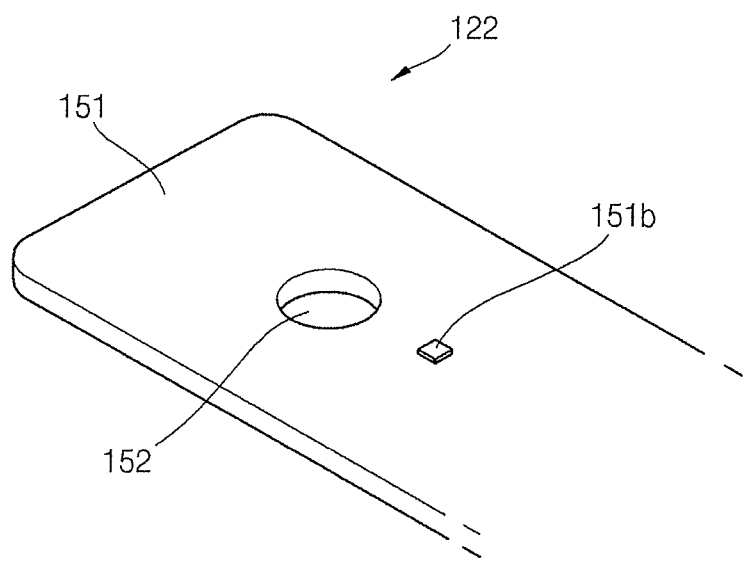
FIGS. 4A through 4D sequentially illustrate a method of assembling the terminal of a rechargeable battery according to an embodiment of the present invention.

As shown in FIG. 4A, a terminal throughhole 152 is first formed to allow the first current collecting terminal 122 to pass therethrough, and a cap plate 151 having a protrusion 151b formed on its surface is then prepared. Here, the protrusion 151 is engaged with a groove of the upper insulation member 155, which will later be described.

Figure 4B:
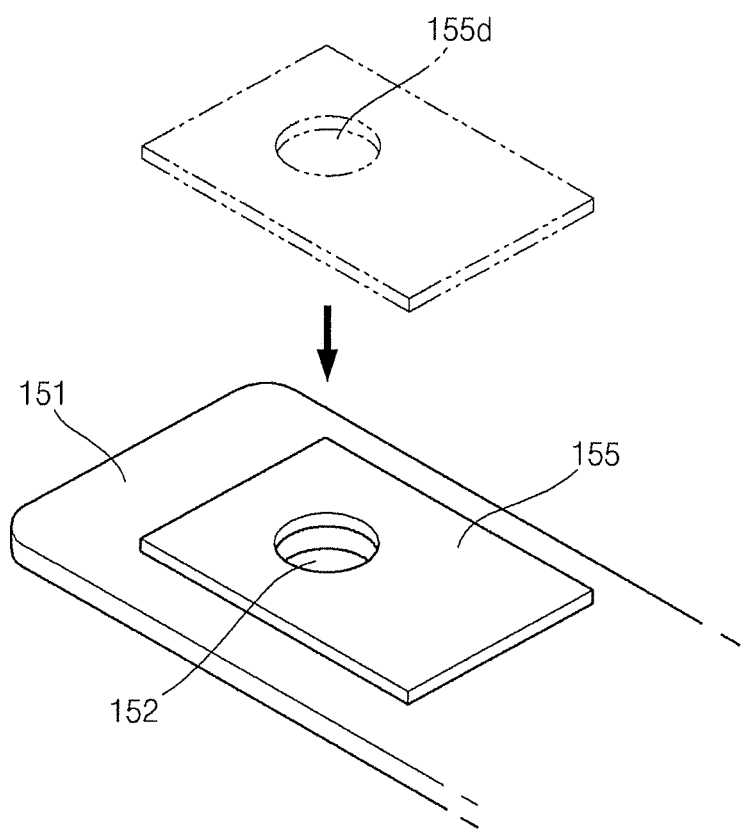

As shown in FIG. 4B, the upper insulation member 155 is coupled to the cap plate 151. Here, the upper insulation member 155 has a throughhole 155d formed to allow the first current collecting terminal 122 to pass therethrough for coupling. The upper insulation member 155 is seated on the cap plate 151 and is also coupled to the protrusion 151b. The upper insulation member 155 is not rotatable about the first current collecting terminal 122.

Figure 4C:
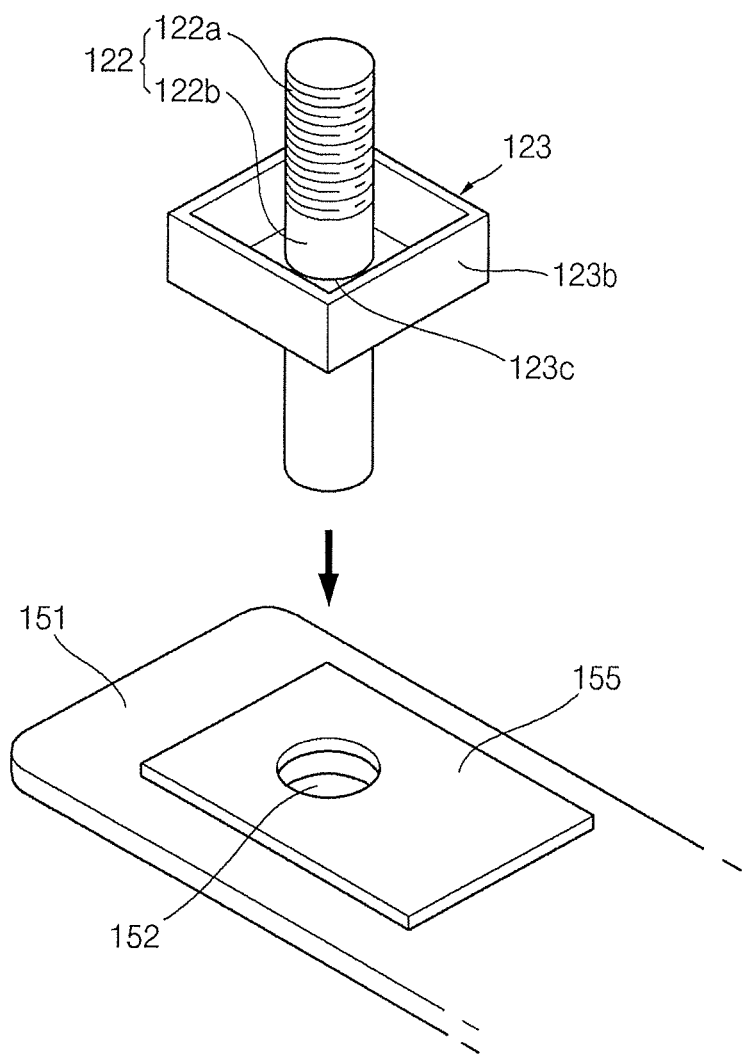
Figure 4D:
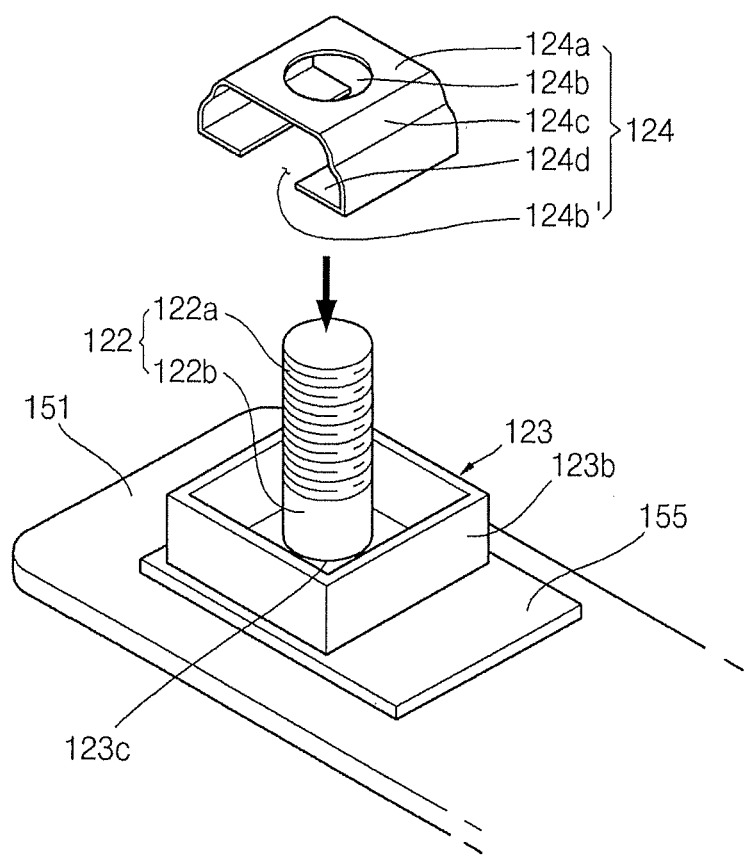

As shown in FIG. 4C, the first terminal plate 123 and the first current collecting terminal 122, which are integrally formed with each other, are coupled to the cap plate 151 and the upper insulation member 155. Here, a throughhole 123a is formed in approximately a central portion of the terminal body 123c of the first terminal plate 123, and the first current collecting terminal 122 passes through the throughhole 123c and is welded thereto. The first terminal plate 123 is integrally formed with the first current collecting terminal 122. Here, the first current collecting terminal 122 is electrically insulated from the cap plate 151 by a seal gasket.

In addition, a plurality of threads are formed on an upper portion of the first current collecting terminal 122 coupled to the first terminal plate 123. A lower portion of the first current collecting terminal 122 coupled to the first terminal plate 123 passes through a terminal throughhole of the cap plate 151 and a throughhole of the upper insulation member 155 to then be engaged therewith. The first terminal plate 123 is closely adhered to the upper insulation member 155. Therefore, the first terminal plate 123 and the cap plate 151 are electrically insulated from each other.

As shown in FIG. 4D, a first plate spring 124 is coupled to the first current collecting terminal 122 protruding from the first terminal plate 123. The first plate spring 124 has a hollow internal space, and a throughhole 124b formed on its top surface 124a thereof and a throughhole 124b' formed on its separated bottom surface 124d. A central portion of the top surface 124a of the first plate spring 124 is higher than a top surface of the terminal plate 123. Peripheral edges 124c of the top surface 124a of the first plate spring 124 are lower than a central portion thereof. Therefore, when a bus bar to be described later is coupled to the top surface 124a of the first plate spring 124, a permanent contact between the bus bar and the top surface 124a of the first plate spring 124 is established due to repulsion caused by elasticity of the top surface 124a, and a coupling force can be maintained.

Figure 5:
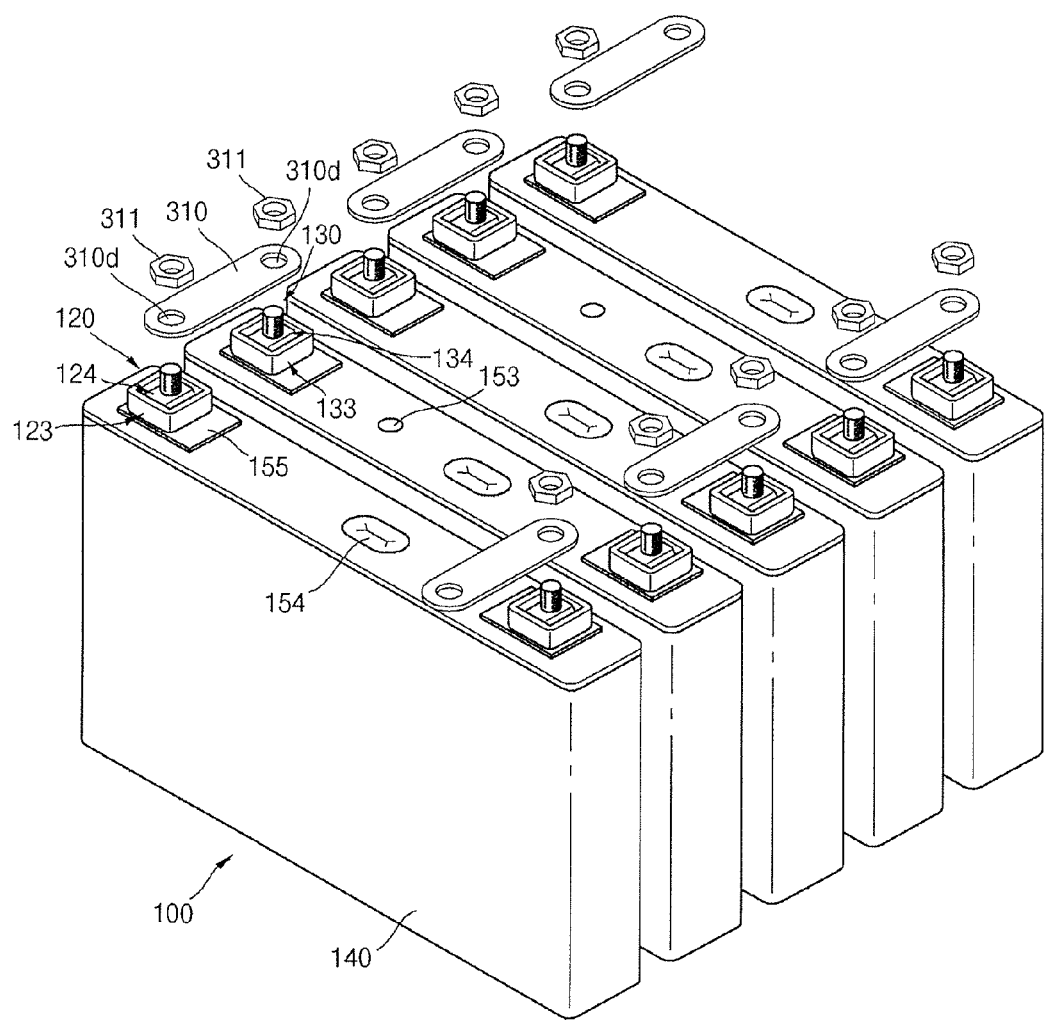
FIG. 5 is a perspective view of a module of a rechargeable battery according to another embodiment of the present invention.

FIG. 5 is a perspective view of a module of a rechargeable battery according to another embodiment of the present invention.

As shown in FIG. 5, a plurality of rechargeable batteries 100 may be connected in series and/or parallel to each other by a conductive bus bar 310. Here, the conductive bus bar 310 has throughholes 310d formed at both ends thereof, and a first current collecting terminal 122 and a second current collecting terminal 132 are coupled to the throughholes 310d provided in each of the plurality of rechargeable batteries 100. In other words, the plurality rechargeable batteries 100 are coupled to each other on the respective plate springs 124 and 134 by the conductive bus bar 310. In addition, nuts 311 are coupled to the first current collecting terminal 122 and the second current collecting terminal 132 passing through the conductive bus bar 310. In one embodiment, the first current collecting terminal 122 and the second current collecting terminal 132 passing through the conductive bus bar 310 may be riveted to the conductive bus bar 310.

Therefore, the conductive bus bar 310 may be coupled to the first current collecting terminal 122 or the second current collecting terminal 132 using the nuts 311, or may be riveted to the first current collecting terminal 122 or the second current collecting terminal 132, while being closely adhered to the first plate spring 124 and the second plate spring 134, thereby maintaining and increasing a coupling force therebetween by flexibly absorbing external forces applied to the first current collecting terminal 122 or the second current collecting terminal 132.

As described above, the conductive bus bar 310 is coupled to the first current collecting terminal 122 or the second current collecting terminal 132 using the nuts 311 or is riveted to the first current collecting terminal 122 or the second current collecting terminal 132, thereby establishing coupling between the conductive bus bar 310 and the current collecting terminals 122 and 132. Moreover, a relatively large current path is formed through the current collecting terminals 122 and 132, the plate springs 124 and 134, and the bus bar 310, thereby reducing electric resistance of the terminals 122 and 132.

Further, in the illustrated embodiment of the present invention, the plate springs 124 and 134 are assembled with the terminal plates 123 and 133 in a simplified process, thereby minimizing a space for coupling the bus bar 310 and improving the efficiency of the coupling process thereof.

Figure 6:
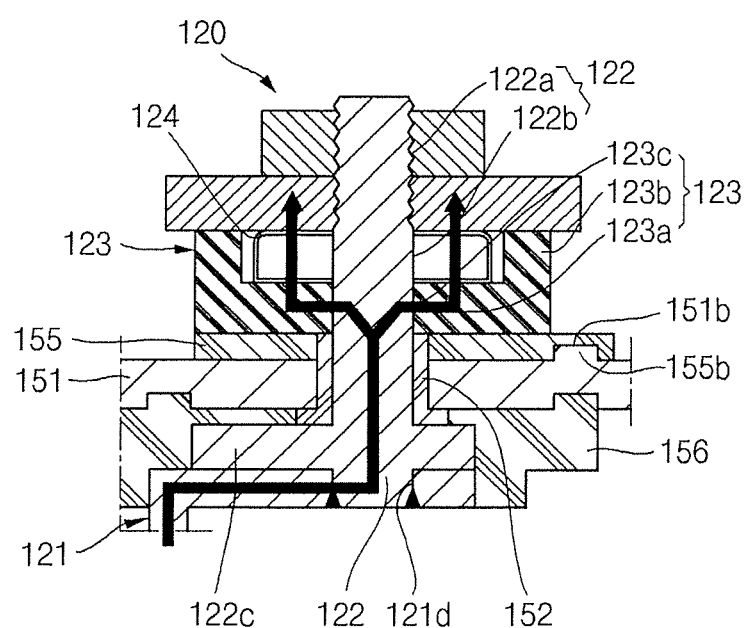
FIG. 6 is a cross-sectional view illustrating a state in which a terminal of the rechargeable battery and a bus bar are coupled to each other.

FIG. 6 is a cross-sectional view illustrating a state in which a terminal of the rechargeable battery and a bus bar are coupled to each other.

As shown in FIG. 6, the bus bar 310 is coupled to the current collecting terminal 124. More specifically, a bolt portion 122a of the current collecting terminal 122 is coupled to the throughholes 310d of the bus bar 310. In addition, the nut (311 of FIG. 5) is closely adhered to the bolt portion 122a corresponding to an upper portion of the bus bar 310, thereby allowing the bus bar 310 to be closely adhered to the plate spring 124. Therefore, the plate spring 124 having a relatively large cross-sectional area is located between the current collecting terminal 122 and the bus bar 310, thereby increasing a current path and reducing contact resistance.

The bus bar 310 may be made of any one selected from stainless steel, aluminum, an aluminum alloy, copper, a copper alloy, and equivalents thereof, but is not limited thereto. In FIG. 6, arrows indicate discharge current paths.

Although particular embodiments of the a terminal of a rechargeable battery, a method of assembling the terminal of a rechargeable battery, a rechargeable battery module and a method of assembling the rechargeable battery module according to the present invention have been shown and described, it would be appreciated by those skilled in the art that changes may be made in this embodiment without departing from the principles and spirit of the invention, the scope of which is defined in the claims and their equivalents.

What is claimed is:

1. A terminal of a rechargeable battery, the terminal comprising:
    a current collecting terminal electrically coupled to an electrode assembly inside a case, wherein the current collecting terminal protrudes from the case;
    a terminal plate outside of the case and coupled to the current collecting terminal; and
    a plate spring on the terminal plate and coupled to the current collecting terminal, wherein the plate spring has a hollow internal space and a throughhole on a top surface and a bottom surface, wherein the current collecting terminal passes through the throughhole on the top and bottom surfaces; and wherein peripheral edges of a top surface of the plate spring are recessed from a central portion thereof.

2. The terminal of claim 1, wherein the current collecting terminal and the terminal plate are integral with each other as a single piece.

3. The terminal of claim 1, wherein the current collecting terminal comprises:
    a current collecting body electrically coupled to the electrode assembly and coupled to the terminal plate; and
    a bolt portion extending from the current collecting body.

4. The terminal of claim 1, wherein the terminal plate comprises:
    a terminal body having a throughhole configured to allow the current collecting terminal to pass therethrough; and
    a sidewall portion extending from a periphery of the terminal body.

5. The terminal of claim 1, wherein an interior portion of the top surface of the plate spring protrudes past a top surface of the terminal plate.

6. The terminal of claim 1, wherein the plate spring comprises any one selected from phosphor bronze, beryllium copper, and yellow brass.

7. The terminal of claim 1, wherein an insulation member is located between the terminal plate and the case.

* * * * *